Dec. 19, 1939.  H. G. HUTCHENS ET AL  2,183,866

ELECTRIC STOVE

Filed Aug. 5, 1938    3 Sheets-Sheet 1

INVENTORS.
Harold G. Hutchens and
James H. Crosier.
BY
Russell B. Griffith
ATTORNEY.

Dec. 19, 1939.　　H. G. HUTCHENS ET AL　　2,183,866
ELECTRIC STOVE
Filed Aug. 5, 1938　　3 Sheets-Sheet 2

INVENTORS
Harold G. Hutchens and
James H. Crosier
BY
　　　　ATTORNEY.

Dec. 19, 1939. H. G. HUTCHENS ET AL 2,183,866
ELECTRIC STOVE
Filed Aug. 5, 1938 3 Sheets-Sheet 3

INVENTORS
Harold G. Hutchens and
James H. Crosier
BY Russell B. Griffith
ATTORNEY.

Patented Dec. 19, 1939

2,183,866

UNITED STATES PATENT OFFICE 2,183,866

ELECTRIC STOVE

Harold G. Hutchens and James H. Crosier, Brighton, N. Y., assignors to The Chef Master Corporation, Rochester, N. Y., a corporation of New York Application August 5, 1938, Serial No. 223,295

4 Claims. (Cl. 219—43)

Our present invention relates to cooking devices and more particularly to electric stoves of a nature wherein an electrically energized heating unit is utilized in connection with associate devices to broil, fry, bake and generally heat or maintain in a heated condition different foods individually requiring different treatments. The general purpose of the invention is to provide a stove of this kind that may be produced at a relatively low cost and will offer advantages of construction whereby its heating facilities become applicable to several of the varied requirements of general cooking. Specifically, the improvements relate to means whereby a multiplicity of units may be arranged and re-arranged for particular purposes; whereby a convenient tray support for the heating element may be changed in its position to cooperate with that element in a different capacity, and whereby a cooking unit may be offered in which, with a minimum of manipulation, several treatments may be accorded a food preparation. To these and other ends, the invention resides in certain improvements and combinations of parts, all as will be hereinafter more fully described, the novel features being pointed out in the claims at the end of this specification.

In the drawings.

Similar reference numerals throughout the several views indicate the same parts.

Figure 3:
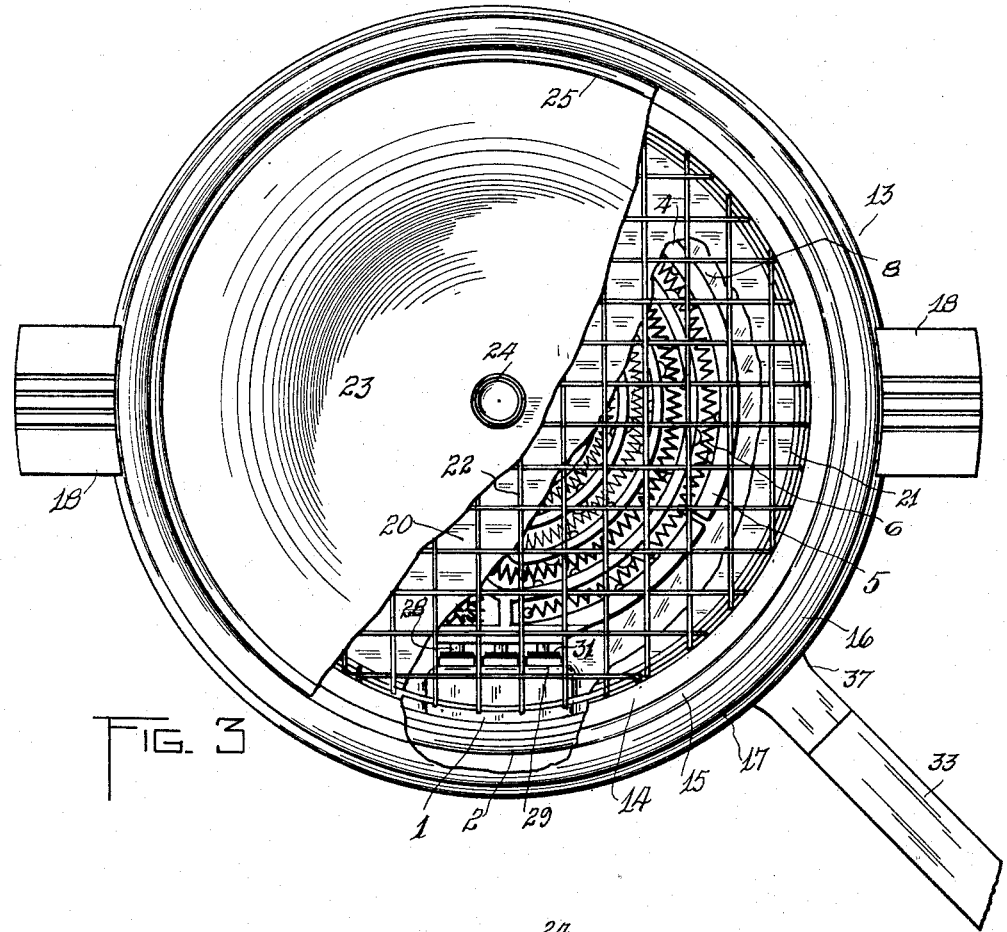
Fig. 3 is a top plan view partly broken away of the assembled units in a condition that does not correspond to Figs. 1 and 2 but fits the stove for another use.
Figure 4:
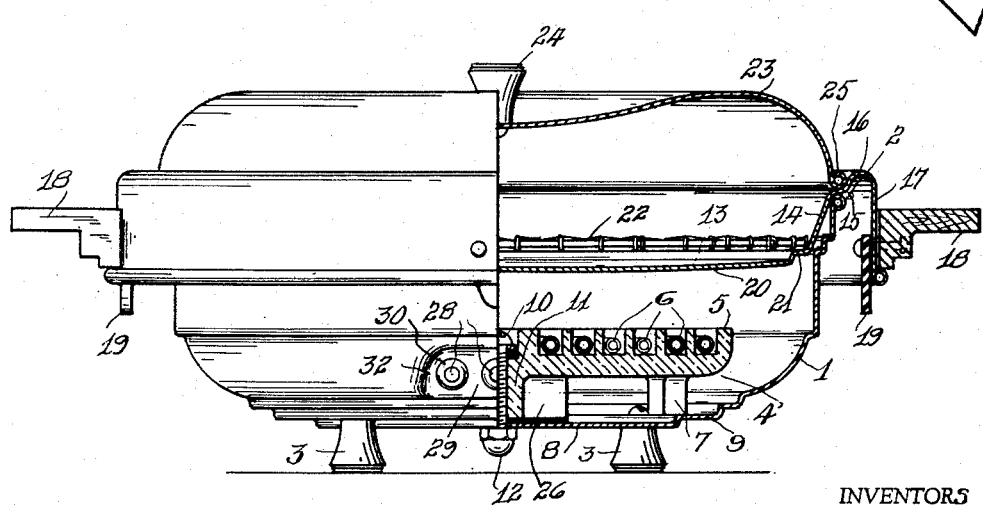
Fig. 4 is a side elevation, partly in section, of the device as assembled in Fig. 3.
Figure 5:
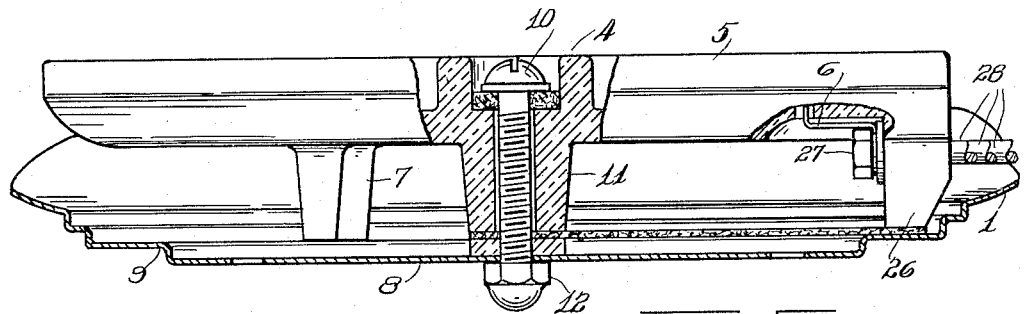
Fig. 5 is a partial vertical section, enlarged, through the heating unit in the position of Fig. 4.
Figure 6:
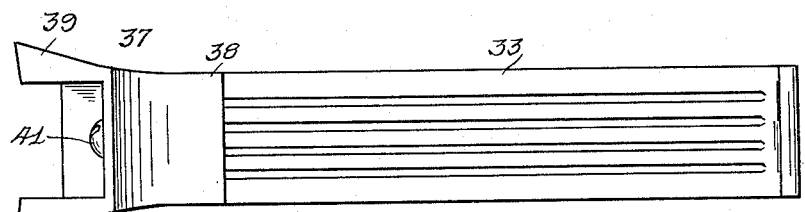
Fig. 6 is a bottom plan view of the heating unit handle assembly, much enlarged.
Figure 7:
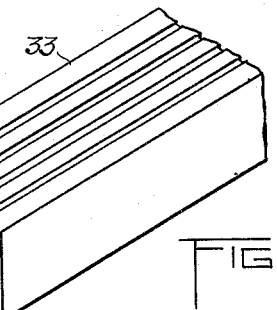
Fig. 7 is a perspective view of the wooden handle portion of the showing of Fig. 6.
Figure 8:
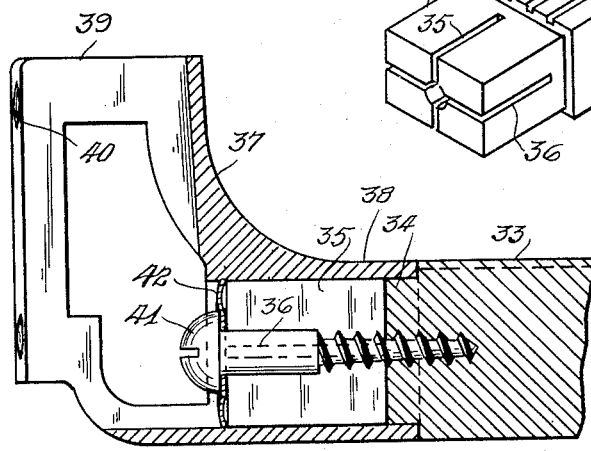
Fig. 8 is a further enlarged vertical section of the handle connection of the heating unit.
Figure 9:
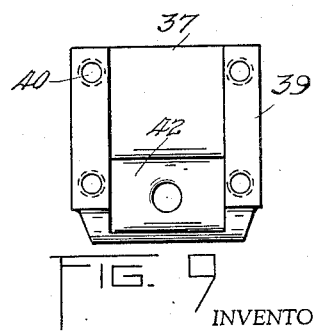
Fig. 9 is an end view of the handle connection as it appears in Fig. 6.

Referring more particularly to the drawings, we show in Fig. 4 a composite of our device including all of the parts but arranged in a particular way. By the latter statement we mean, for instance, that a food article is either being baked or being held in a warm condition. On this assumption and still referring specifically to Figs. 3 and 4, 1 indicates a pan shaped heating casing or body member having a beaded rim 2 and suitable non-heat conducting supporting legs 3. Within the body of the pan is a heating element 4. This latter consists, in the present instance, as illustrated in Figs. 3, 4 and 5, of a circular porcelain casting 5 circularly grooved on what we will call the upper side to receive the well known electrical resistance heating wires 6. On its underside, on the same conception of top and bottom, it is provided with legs 7 that rest upon the bottom 8 of the heating casing 1, said legs bearing actually upon annular shoulders 9 spun or stamped in the carrying element. By means of a bolt 10 with suitable connections running centrally through a hub 11 on the element 4 the latter is fastened to the bottom 8 of the body 1, a cap nut 12 on the outside consummating the connection.

Still referring to Figs. 3 and 4, there is superposed in this instance upon the pan body 1 a relatively shallow tray 13, the side wall 14 of which is provided with a shoulder 15 that centers, positions and supports it upon the bead 2. Beyond this shoulder the material of the side wall rises outwardly to form an annular rib 16 and thence proceeds downwardly to form an encircling skirt 17. Fastened to this skirt are suitable non-heat conducting handles 18 and also further downwardly projecting heat insulating legs 19 for a purpose that will hereinafter appear.

By reason of the side wall 14 and its shoulder 15, the bottom 20 of the tray becomes reentrant and is brought down quite close to the heating element 4 and its coil 6 but a shoulder 21 between the side wall and the bottom supports a woven wire or similar grid 22 just above or in spaced relationship to the bottom.

A cover 23 provided with a central lifting knob or handle 24 overlies the tray upon which it is closely superposed. This cover is provided with a beaded rim 25 that fits against the shoulder 15 in the same manner that the latter rests upon the bead 2 of the body 1 of the heating unit, being easily centered within a depression formed by the rib 16.

With the stove units thus assembled and so far described, a completely enclosed cooking chamber heated by the coils 6 of the enclosed body 1 is provided. It may be used for baking or for merely maintaining food warm with or without the grid 22 in both instances. With the grid the assembly may be used as a steamer, the water content, of course, being introduced between the bottom 20 and the grid 22.

At this point it may be mentioned, as will be hereinafter further explained, that the intensity of the heat developed in the coil 6 may be regulated. This provision, taken with the fact that the reentrant contour of the tray 13 drops its bottom 20 down so close to the coils, makes the tray and the general arrangement very effective in cooking pancakes on the bottom 20 as a griddle, as well as other articles that require a very hot pan. In the baking or frying of griddle cakes, the grid as well as the cover 23 are, of course, dispensed with.

Figure 1:
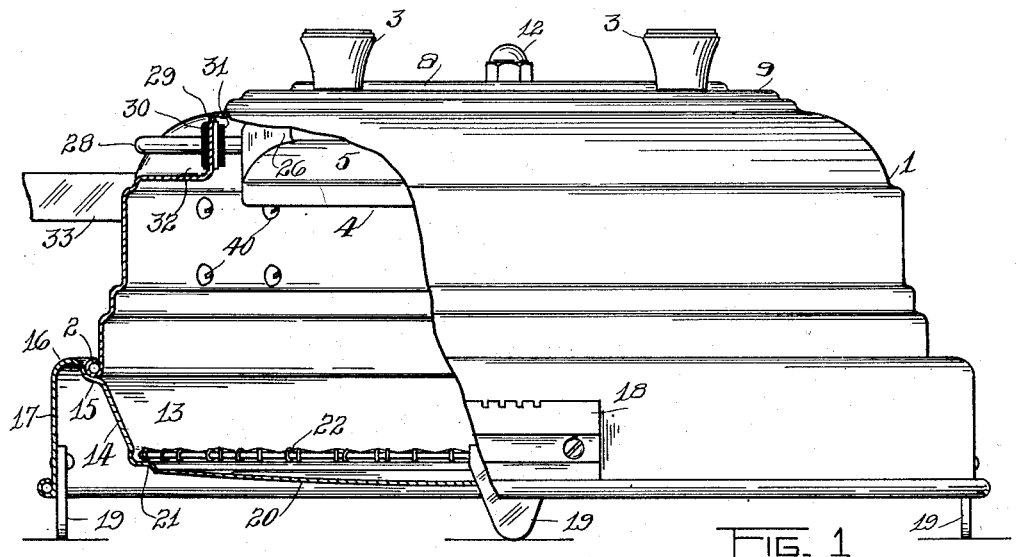
Fig. 1 is a side elevation, partly broken away in vertical section, of an electric stove constructed in accordance with and illustrating one embodiment of our invention as assembled for broiling.
Figure 2:
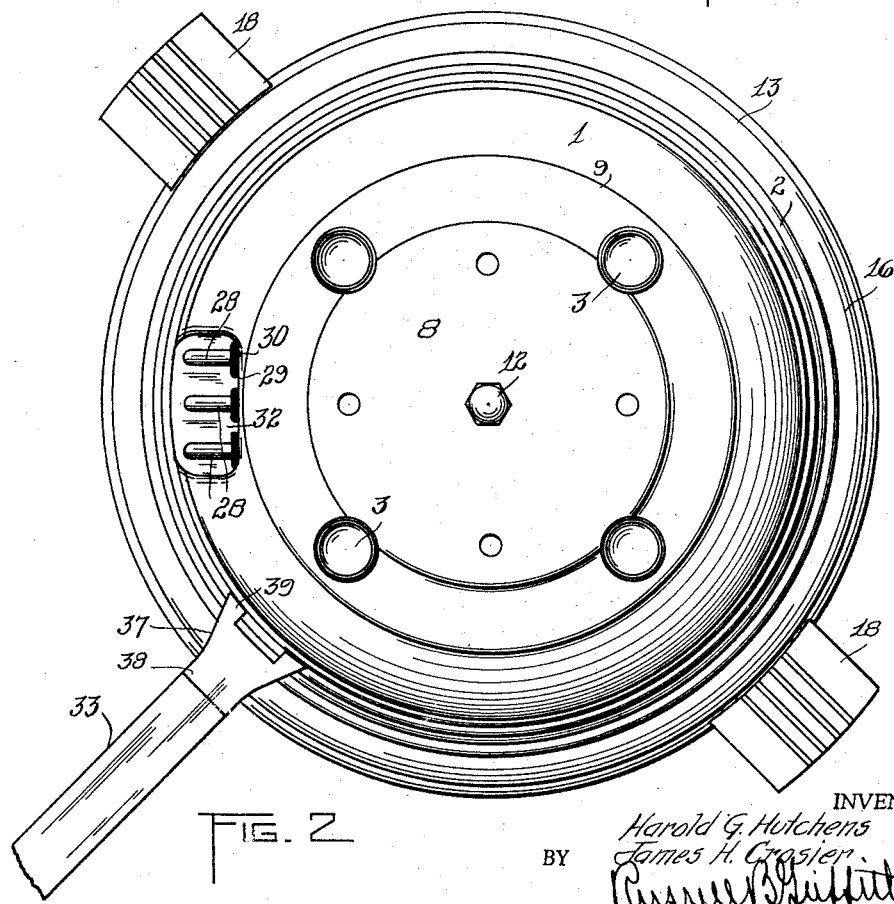
Fig. 2 is a bottom plan view of the unit that comprises the heating element but which, in connection with Fig. 1, represents a top plan view of the element as applied to the companion units.

Turning now to the assembly of Figs. 1 and 2, only a part of the assembly previously described with respect to Figs. 3 and 4 is utilized. The purpose in hand is to use the stove as a broiler, in which practice the food under treatment, as, for instance, a steak, is supported below and the heating unit is superposed thereon. In this assembly the pan 13 becomes the base element and rests upon the table or other supporting surface by means of its heat insulating legs 19. The body casing 1 of the heating unit is inverted and its bead 2, hitherto a supporting bead, becomes a supported bead resting upon the shoulder 15 of the flange of pan 13 in the same manner that hitherto, in the description, the bead 25 of cover 23 has rested in the same position. The body bead is similarly centered by the rib 16. It is here that the grid 22 performs its best function, in that it supports the steak or other article above the bottom 20 allowing heat development and the collection of juices. The heat is thrown down against the grid and an enclosed cooking chamber is again established like the baking chamber enclosed by the cover 23 in the assembly of Fig. 4.

It has previously been pointed out that body element 1 and cover 23 with their respective beads 2 and 25 are diametrically coincident, as appears in Fig. 4. Therefore, in the assembly under discussion, it is obvious that when the broiling operation has been completed, the body heating unit 1 may be removed, inverted and separately set aside on its independent legs 3 and the cover 23 directly applied to pan 13 (though this assembly is not specifically shown) to provide a serving dish acceptable for use at the eating table and thus conserving the warmth of the contents even though no heating element is continuously present.

The above description covers in a general way the cooking capabilities of our stove. We now turn to structural advantages of the several units employed.

With reference to the heating unit or body indicated at 1, we have previously described how the actual heating element embodying the porcelain 4 and the coil 6 is supported therein. Obviously, a circuit must be established from an outside line of electrical supply. This is done in the usual manner to the extent that a cord and socket plug is employed, the same being of a nature commonly used in electrical household devices (not shown). In our present embodiment, in addition to the legs 7 or as one of them, the porcelain or other insulating carrier 4 for the coils 6 lying in the grooves thereof has a lug 26. In this lug are suitably fixedly set, as by the nuts 27, three terminal posts 28 that project radially outwardly in parallelism. They fit into and unattachedly extend through three corresponding adjacent openings in a wall 29 of the body element or casing 1. They do not, however, actually contact this wall (which is of metal) as such, but contact and rest against or are insulated by grommets and washers 30 and 31 with which the wall is fitted (see particularly Fig. 1). The said wall 29 is the inner wall or the one next the geometrical center of the body or casing. It is formed by stamping in a depression indicated at 32 in what is otherwise the generally circular contour of the pan shaped body itself. In assembling the heating unit, the heating element 4 with these terminals is dropped into the bottom of the pan 1 with a tilting motion whereby such terminal posts 28 are projected through the wall 29 and openings therein and the accompanying grommets and washers 30 and 31 with one motion so that the relationship of Figs. 1 and 2 is established. The bolt 10 and nut 12, thereafter being applied, perfect and maintain this relationship.

By observation of these same two Figs. 1 and 2, it will at once appear that the longer portions of the terminal posts 28 will project exteriorly but that they will not project beyond the circumferential confines of the carrying element or casing. Thus they lie in the exterior depression 32 of the casing from which they do not extrude and when it comes to applying the socket of the ordinary supply line or "cord" thereto, this is pressed into place without hindrance.

A point here made is that it has been usage heretofore practiced in such devices to so construct corresponding heating elements within a heating unit or container that the latter was required to be provided with an open side through which such contact could be made between the supply cord socket element and the terminal posts with the latter arranged interiorly instead of exteriorly. With our arrangement the container remains practically sealed interiorly and exteriorly and the application of the socket plug from the line wire is left in view. Furthermore, the socket plug is an insulated element and as such comes in contact only with the insulated elements 30 offset outwardly from any metal parts.

With respect to the previous description of the triple terminal posts 28, it is explained that these are not important to our invention, that is, as to number. Referring to our previous statement that the heat generated in the coils 6 of the heating unit 4 is regulatable, we explain that these coils are not all in one circuit. On the other hand, they are in a plurality of circuits having both separate and common terminals resident in the posts 28. The line attaching socket member is cooperatively wired so that in one position of attachment it closes the circuit in one coil producing a minimum heat and when reversed completes the circuit in both coils giving a maximum heat of the two combined. This practice is known to those skilled in the art, for which reason further explanation and illustration has been dispensed with.

The body or heating unit 1 is the one, as will appear from the foregoing, that is most generally manipulated although, as before set forth, the important cooperating tray element 13 has lifting handles 18. For the reason first expressed, we prefer to provide the unit 1 with a pan handle indicated at 33 in the general views. A feature of our invention resides in a simple, strong and efficient attachment of this handle to the body 1 whereby it may be supplied attractively at a low cost. Referring more particularly to Figs. 6 to 9, the gripping portion of this handle 33 is formed of wood or similar material with a reduced inner end portion 34 having transverse intersecting kerfs 35 and 36. Over this reduced portion is fitted an integral ferrule casting 37 with a complementary socket portion 38 to take it. The inner end of such socket portion is enlarged into a hollow bracket or yoke portion 39 which is screwed to the side walls of the pan 1 at 40. A screw 41 is driven into the reduced portion 34 centrally but under its head is placed an expanding spring washer 42 which, when spread, is slightly larger than the socket portion 38. When this screw is tightened, the result is three-fold, namely, it expands the bisected reduced portion 34 tightening it against the walls of the socket; it expands the washer 42 causing it to bite into the walls of the socket, and it draws the handle and socket together. This produces a very simple assembly, which is most efficient and practical in use.

We claim as our invention:

1. In an electric stove, the combination with a circular body casing and a heating element contained in the bottom thereof, of a cooking pan having a marginal shoulder extending outwardly and thence upwardly adapting it to rest upon the rim of the body by means of its outwardly extending portion and provided with a reentrant bottom that is thereby brought into close proximity to the heating element, and a cover of the same diameter as the body also adapted to seat against the outwardly extending portion of the cooking pan shoulder but on the opposite side thereof, said pan being thereby provided with an annular raised rib adjacent to the shoulder within which the cover is centered and easily applied to be confined below the upwardly turned portion of such shoulder.

2. In an electric stove, the combination with a circular body casing and a heating element contained in the bottom thereof, of a cooking pan having a shoulder adapting it to rest upon the rim of the body and provided with a reentrant bottom that is thereby brought into close proximity to the heating element, and a cover of the same diameter as the body also adapted to seat against the shoulder but on the opposite side thereof, said pan being further provided with an annular rib adjacent to the shoulder within which the cover is centered and with a downwardly turned skirt having legs depending below the bottom of the pan.

3. In an electric stove, the combination with a circular body casing and a heating element contained in the bottom thereof, of a cooking pan having a shoulder adapting it to rest upon the rim of the body and provided with a reentrant bottom that is thereby brought into close proximity to the heating element, said pan being further provided with an annular rib adjacent to the shoulder and with a downwardly turned skirt proceeding therefrom and having legs depending below the bottom of the pan whereby the body may be inverted to rest upon the top of the pan shoulder and the latter becomes the supporting element.

4. In an electric stove, the combination with a circular dished body member having an external cavity in its side providing a small indented vertical wall projected into the interior, said wall being provided with a plurality of openings, of a heating element secured to the bottom of the body and comprising a block of refractory material carrying resistance coils, said block having a depending lug at one side adjacent to the indented wall, and terminal posts for the coils secured in the block and projecting through said wall to occupy the external cavity and receive therein a socket member on a supply line.

HAROLD G. HUTCHENS.
JAMES H. CROSIER.